United States Patent [19]

Ishida et al.

[11] Patent Number: 5,105,623

[45] Date of Patent: Apr. 21, 1992

[54] HYDRAULIC BOOSTER WITH NOISE REDUCING TUBULAR MEMBER DISPOSED IN SPOOL

[75] Inventors: Satoshi Ishida, Chiryu; Michiharu Nishii, Toyota; Kyousuke Hata, Kariya, all of Japan

[73] Assignee: Aisin Seiki Kabushiki Kaisha, Kariya, Japan

[21] Appl. No.: 588,182

[22] Filed: Sep. 26, 1990

[30] Foreign Application Priority Data

Sep. 29, 1989 [JP] Japan .................. 1-256133

[51] Int. Cl.⁵ .............................................. B60T 13/00
[52] U.S. Cl. .................................................... 60/547.3
[58] Field of Search .............. 60/547.1, 547.3, 547.2, 60/548, 549, 550, 551, 552, 560; 137/625.68; 91/445, 448

[56] References Cited

U.S. PATENT DOCUMENTS

| | | | |
|---|---|---|---|
| 3,747,475 | 7/1973 | Runkle | 91/445 |
| 4,014,171 | 3/1977 | Kobashi | 60/547.3 |
| 4,250,795 | 2/1981 | Martinic | 137/625.68 X |

FOREIGN PATENT DOCUMENTS

| | | |
|---|---|---|
| 59-209948 | 11/1984 | Japan . |
| 1367750 | 9/1974 | United Kingdom . |
| 1369742 | 10/1974 | United Kingdom . |
| 2023757 | 1/1980 | United Kingdom . |
| 2091363 | 7/1982 | United Kingdom . |

Primary Examiner—Edward K. Look
Assistant Examiner—John Ryznic
Attorney, Agent, or Firm—Burns, Doane, Swecker & Mathis

[57] ABSTRACT

The invention is directed to a hydraulic booster for use in a hydraulic braking system of an automotive vehicle having a power source for generating a hydraulic power pressure, a reservoir and a master cylinder for generating a hydraulic braking pressure in response to movement of an input rod. The hydraulic booster has a housing defining therein a boost chamber, a power piston received in the boost chamber for transmitting a boost force to the master cylinder, and a pressure control valve which introduces the hydraulic power pressure from the power source and controls it in response to the movement of the input rod. The pressure control valve includes a cylinder defining therein a bore and a spool received in the bore. The spool has an axial hole and at least two radial holes facing each other and communicating with the axial hole. And, a tubular member is disposed in the axial hole of the spool to prevent the interference of the hydraulic power pressures introduced into the axial hole through the radial holes facing each other, whereby an uncomfortable noise caused by the interference is effectively prevented.

7 Claims, 3 Drawing Sheets

HYDRAULIC BOOSTER WITH NOISE REDUCING TUBULAR MEMBER DISPOSED IN SPOOL

BACKGROUND OF THE INVENTION

1. Field of the Invention

The present invention relates to a hydraulic booster for use in a hydraulic braking system of an automotive vehicle, and more particularly to a hydraulic booster provided with a pressure control valve having a spool moved in response to movement of an input rod between a power position affording the communication between a boost chamber and a hydraulic power source, and a stop position affording the communication between the boost chamber and a reservoir, and having an axial hole affording the communication between the reservoir and the boost chamber in the stop position and at least two radial holes facing each other for introducing a hydraulic power pressure from the hydraulic power source into the axial hole of the spool in the power position.

2. Description of the Prior Art

In conventional service braking system for a vehicle, a boosting device called a servo or a booster is mounted in order to reduce a force applied on a brake pedal in braking operation, and compressed air, negative pressure in an intake manifold (for a vacuum booster) or fluid pressure (for a hydraulic booster) is used as a power source.

For example, as disclosed in Japanese Patent Laid-open Publication No. 59-209948, a hydraulic booster using the hydraulic pressure is so structured that a hydraulic pressure generator such as a master cylinder is boosted in response to depression of a brake pedal with a hydraulic power pressure discharged from a hydraulic power source. This hydraulic booster is disposed in a tandem master cylinder and includes a pressure control valve having a spool moved in response to movement of an input rod between a power position affording the communication between a boost chamber and the hydraulic power source, and a stop position affording the communication between the boost chamber and a reservoir. The spool has an axial hole affording the communication between the reservoir and the boost chamber in the stop position and two radial holes facing each other for introducing a hydraulic power pressure from the hydraulic power source into the axial hole through the radial holes in the power position.

However, in the conventional hydraulic booster as described above, since the radial holes are provided to face each other in order to prevent the spool from being applied with uneven load, when the spool is moved to its power position for blocking the communication between the boost chamber and the reservoir, and affording the communication between the boost chamber and the hydraulic power source in accordance with the displacement of the input rod moved in response to depression of the brake pedal, streams of the hydraulic power pressure fed from the hydraulic power source are introduced from the radial holes into the axial hole to interfere with each other. Thus, when the spool is abruptly moved, the opposing jet streams of the hydraulic power pressure will severely interfere with each other to cause an uncomfortable noise.

SUMMARY OF THE INVENTION

Accordingly, it is an object of the present invention to prevent an uncomfortable noise from being generated due to the interference of the streams of the hydraulic power pressure introduced into the hydraulic booster.

It is another object of the present invention to provide means for preventing the interference of the streams of the hydraulic power pressure easily and economically.

In accomplishing these and other objects, a hydraulic booster for use in a hydraulic braking system of an automotive vehicle has a power source for generating a hydraulic power pressure, a reservoir for storing an amount of brake fluid, and a master cylinder for introducing the brake fluid thereinto from the reservoir and generating a hydraulic braking pressure in response to movement of an input rod. The hydraulic booster comprises a housing connected to the master cylinder for defining therein a boost chamber, a power piston received in the boost chamber and slidably supported by the housing for transmitting a boost force to the master cylinder in response to the movement of the input rod, and a pressure control valve disposed in the housing for introducing the hydraulic power pressure from the power source and controlling the hydraulic power pressure in response to the movement of the input rod. The pressure control valve includes a cylinder fixed to the housing for defining therein a bore, and a spool which is slidably received in the bore and provided with an axial hole defined therein and at least two radial holes facing each other and communicating with the axial hole. The spool is arranged to be positioned to communicate the axial hole with the reservoir in a stop position of the spool, and communicate the axial hole with the power source through the radial holes blocking the communication between the axial hole and the reservoir in a power position of the spool. The hydraulic booster further comprises means for preventing the interference of hydraulic power pressures introduced into the axial hole through the radial holes facing each other.

In the above-described hydraulic booster, means for preventing the interference of hydraulic power pressures preferably comprises a tubular member fitted into the axial hole of the spool with a predetermined clearance between the outer surface of the tubular member and the inner surface of the axial hole.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
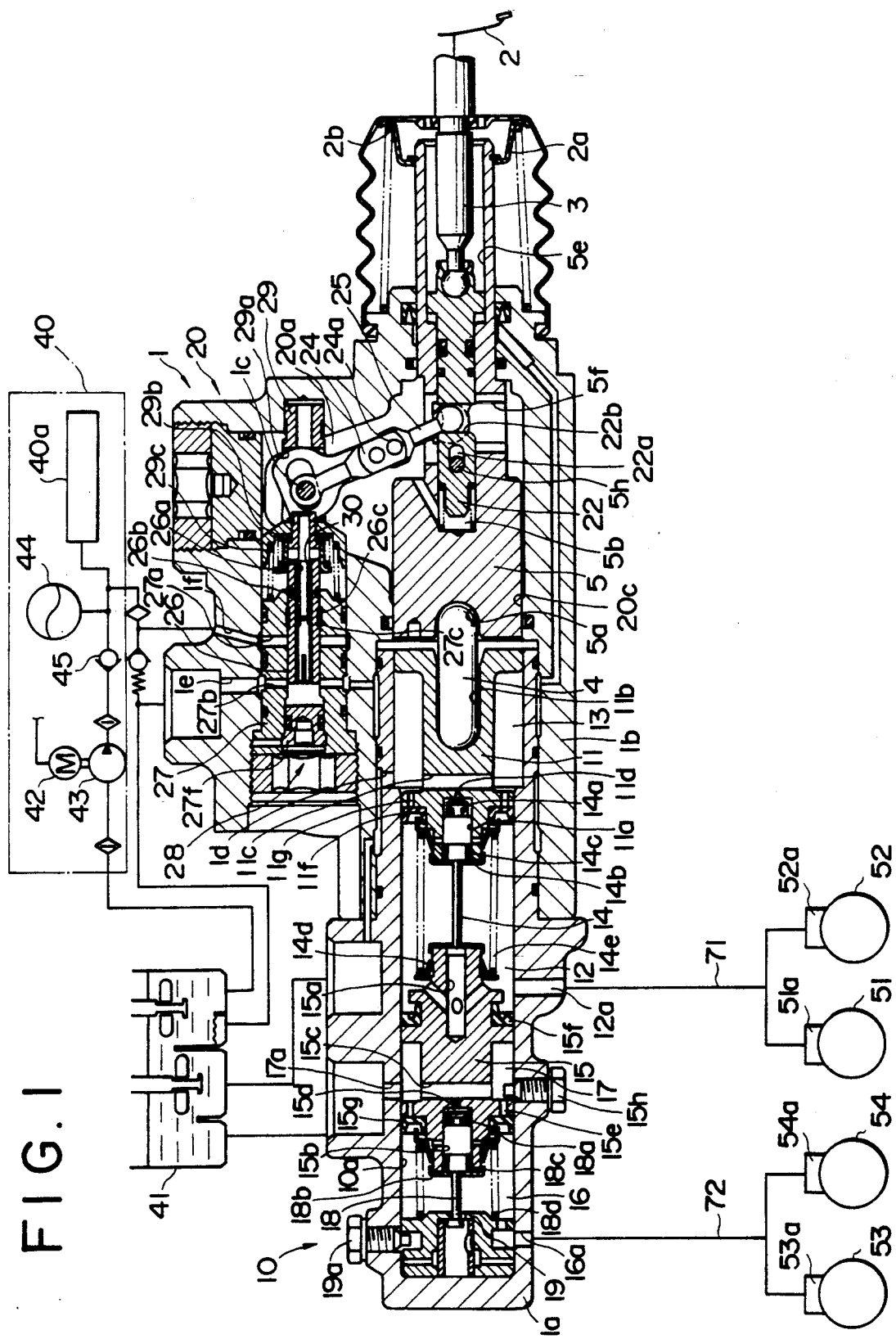
FIG.1 is a schematic illustration of a hydraulic braking system having a hydraulic booster of an embodiment of the present invention.

Referring to FIG.1, there is illustrated a hydraulic braking pressure control apparatus 1 which includes a tandem master cylinder 10 (hereinafter referred to simply as a master cylinder 10) and a hydraulic booster 20.

A depressing force applied on a brake pedal 2 is transmitted as a braking force to the apparatus 1 through an input rod 3. In response to this braking force, a hydraulic braking pressure supplied from a reservoir 41 or a hydraulic power source 40 is properly controlled and discharged to wheel cylinders 51a to 54a mounted on front road wheels 51, 52 and rear road wheels 53, 54, through first and second hydraulic circuits 71, 72.

A first piston 11 and a second piston 15 are fluid-tightly and slidably disposed in a cylinder bore 10a defined in a housing 1a of the master cylinder 10. The first piston 11 has a small-diameter land portion and a large-diameter land portion formed on its opposite ends, and the cylinder bore 10a is formed as a stepped bore having a small-diameter portion and a large-diameter portion respectively for receiving the corresponding land portions. The small-diameter land portion of the first piston 11 is covered by a cup seal 11f, and fluid-tightly and slidably received in the small-diameter portion of the cylinder bore 10a. A first fluid chamber 13 is defined between both land portions within the cylinder bore 10a. The large-diameter portion of the cylinder bore 10a communicates with the reservoir 41 through a port 1d.

The first piston 11 has a pair of holes 11a, 11b formed axially from its opposite ends toward its center. The first piston 11 also has a hole 11c formed radially and open to the first fluid chamber 13, and a hole 11d formed axially for affording the communication between the hole 11c and the axial hole 11a. A valve member 14a which is mounted on one end of a valve rod 14 is slidably received in the hole 11a in opposed relationship with the hole 11d. The valve member 14a is restrained from moving toward the second piston 15 by a retainer 14b. The small-diameter land portion of the first piston 11 has a through hole 11g formed axially, which is covered by the cup seal 11f to constitute a check valve. Further, a spring 14c is disposed between the valve member 14a and the retainer 14b, and normally biases the valve member 14a toward the hole 11d. An output rod 4 is received in the hole 11b.

The second piston 15 has land portions formed on its opposite ends, and cup seals 15f, 15g are fitted on the respective land portions of the second piston 15. A second fluid chamber 17 communicating with the reservoir 41 through a port 17a is defined between both land portions within the cylinder bore 10a. A first pressure chamber 12 is defined between the cup seal 15f of the second piston 15 and the cup seal 11f of the first piston 11. The first pressure chamber 12 communicates with the wheel cylinders 51a, 52a of the front road wheels 51, 52 through a port 12a and the first hydraulic circuit 71. The second piston 15 has a hole 15a formed axially and open to its end face at the side of the first pressure chamber 12. A large-diameter end of the valve rod 14 is slidably received in the hole 15a and restrained from moving toward the first piston 11 by a retainer 14d.

A return spring 14e is mounted between the retainers 14d of the second piston 15 and the retainer 14b of the first piston 11, and biases the first piston 11 and the second piston 15 to be away from each other. Therefore, the opposite ends of the valve rod 14 are normally in engagement with the retainers 14b, 14d. Thus, the valve member 14a is spaced from the hole 11d by a predetermined distance, so that the brake fluid supplied from the reservoir 41 to the first fluid chamber 13 through the port 1d is filled in the first pressure chamber 12 through the hole 11g and also through the holes 11c, 11d and 11a of the first piston 11. When at least either one of the first and second piston 11, 15 slides closing to each other against the return spring 14e, the hole 11g is closed by the cup seal 11f, and the hole 11d is closed by the valve member 14a, so that the first pressure chamber 12 is closed except the port 12a.

Also, the second piston 15 has a hole 15b formed axially on its end face at the bottom side of the cylinder bore 10a. The hole 15b communicates with a hole 15c formed radially and open to a second fluid chamber 17 through a hole 15d formed axially. A valve member 18a mounted on one end of a valve rod 18 is slidably received in the hole 15b in opposed relationship with the hole 15d. The valve member 18a is restrained from moving toward the bottom of the cylinder bore 10a by a retainer 18b. The land portion of the second piston 15 at the bottom side of the cylinder bore 10a has an axial through hole 15e, which is covered by the cup seal 15g to constitute a check valve. Further, a spring 18c is disposed between the valve member 18a and the retainer 18b, and normally biases the valve member 18a toward the hole 15d. A stopper bolt 15h is fixed to the housing 1a so that its head projects into the second fluid chamber 17. When the head of the stopper bolt 15h is brought into contact with the land portion of the second piston 15 at the bottom side of the cylinder bore 10a, the movement of the second piston 15 toward the first piston 11 is restrained.

A holder 19 is provided between the second piston 15 and the bottom of the cylinder bore 10a and fixed to the bottom of the cylinder bore 10a by a stopper bolt 19a. A large-diameter end of the valve rod 18 is engagable with the holder 19 to restrain the valve rod 18 from moving toward the second piston 15. A second pressure chamber 16 is defined between the bottom of the cylinder bore 10a and the cup seal 15g of the second piston 15. A return spring 18d is mounted between the retainer 18b of the second piston 15 and the holder 19, and biases the second piston 15 so as to be away from the holder 19. Accordingly, the opposite ends of the valve rod 18 are normally in engagement with the retainer 18b and the holder 19. Then, the valve member 18a and the hole 15d are spaced from each other by a predetermined distance, so that the brake fluid supplied from the reservoir 41 to the second fluid chamber 17 through the port 17a is filled in the second pressure chamber 16 through the hole 15e and also through the holes 15c, 15d and 15b of the second piston 15. When the second piston 15 slides closing to the holder 19 against the return spring 18d, the hole 15e is closed by the cup seal 15g, and the hole 15d is closed by the valve member 18a, so that the second pressure chamber 16 is closed except a port 16a.

In a housing 1b joined with the housing 1a, a boost chamber 20a of the hydraulic booster 20 is defined and a power piston 5 is slidably and fluid-tightly disposed in a bore 20c, which is substantially coaxial with the cylinder bore 10a and affording the communication between both chambers. The power piston 5 is provided with a retainer 2a on its end at the side of the brake pedal 2, and is biased toward the brake pedal 2 by a biasing force of a spring 2b mounted between the retainer 2a and the housing 1b. The power piston 5 has a shoulder portion formed at its intermediate portion, and the shoulder portion abuts on the housing 1b to thereby prevent the power piston 5 from sliding toward the brake pedal 2.

The power piston 5 has a recess 5a formed on its end at the side of the first piston 11, a bore 5b formed on its center axis and a bore 5e larger in diameter than the bore 5b formed on its center axis. A reaction piston 22 is slidably received in the bore 5b, and a space defined between the top of the reaction piston 22 and the bottom of the bore 5b communicates with the boost chamber 20a. The reaction piston 22 has an elongated hole 22a formed radially and having a longer axis on its axial direction and a through hole 22b extending perpendicularly to the elongated hole 22a. A pin 5h is disposed in the elongated hole 22a and fixed to the power piston 5, so that the reaction piston 22 is restrained from sliding at least toward the brake pedal 2 relative to the power piston 5. The input rod 3 has one end connected to the brake pedal 2 and the other end formed with a spherical head which is inserted into the bore 5e of the power piston 5 and engaged with a projection formed on the inner surface of an open end of the reaction piston 22. The power piston 5 has a through hole 5f formed radially and larger in diameter than the through hole 22b. When the reaction piston 22 is positioned most closely to the brake pedal 2, the through hole 5f is aligned with the through hole 22b. An output rod 4 is received in the recess 5a of the power piston 5.

A support lever 24 is pivotally connected at its one end to the housing 1b by a pin 1c for pivotal movement within the boost chamber 20a, and a spherical head of the support lever 24 is fitted into the through hole 22b of the reaction piston 22. One end of a control lever 25, which is pivotally connected to the support lever 24 by a pin 24a, is fitted into the through hole 5f of the power piston 5. On the other end of the control lever 25, a hole is formed around the pin 1c of the support lever 24. Accordingly, when the reaction piston 22 slides toward the output rod 4 relative to the power piston 5 which is urged toward the brake pedal 2, a rotating force is applied to the support lever 24 so as to pivotally move the support lever 24 clockwise about the pin 1c. At that time, since one end of the control lever 25 is retained in the through hole 5f of the power piston 5, the other end of the control lever 25 is rotated counterclockwise about the pin 24a and thus moved in the same direction as the sliding direction of the reaction piston 22, so that the other end of the control lever 25 is displaced in response to the movement of the reaction piston 22 until it comes into contact with the bottom of the bore 5b.

Figure 2:
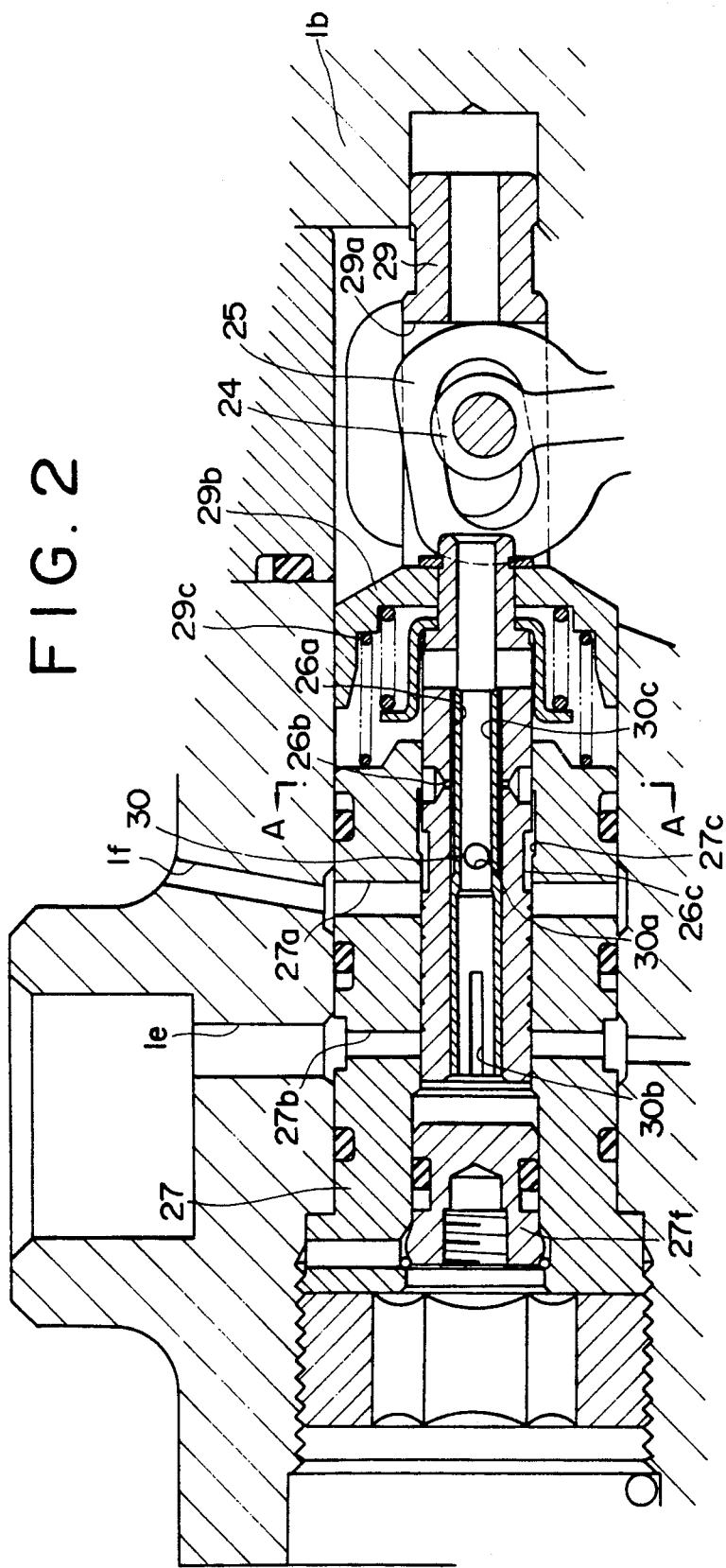
FIG.2 is a sectional view of a spool valve of the hydraulic booster shown in FIG.1 in an enlarged scale.

The housing 1b has a spool valve bore extending substantially in parallel with the power piston 5 and communicating with the boost chamber 20a, and a spool valve 28 functioning as a pressure control valve is received in the spool valve bore. The spool valve 28 has a spool 26 slidably received in a spool bore of a cylinder 27 formed substantially parallel to the power piston 5. The spool 26 has an axial through hole 26a and two radial throttle holes 26b communicating with the hole 26a and facing each other as shown in FIG.2 illustrating the spool valve 28 in the condition of its power position in an enlarged scale. One end of the spool 26 is positioned in the boost chamber 20a and connected to one end of a control rod 29. The other end of the control rod 29 is slidably supported in the housing 1b, and the head of the control lever 25 is fitted into a through hole 29a radially formed in the control rod 29. Between the cylinder 27 and a retainer 29b which is supported at one end of the control rod 29, a spring 29c is mounted so as to bias the spool 26 toward the control lever 25. The hole 26a normally communicates with the boost chamber 20a at the junction between the spool 26 and the control rod 29.

When the control lever 25 is in its stop position (i.e., the stop position of the spool 26), the hole 26a of the spool 26 communicates with the reservoir 41 through a hole 27b formed radially in the cylinder 27 and a drain port 1e formed in the housing 1b. Thus, the spool 26 is held in its stop position, and the boost chamber 20a communicates with the reservoir 41. The cylinder 27 also has a hole 27a formed with a predetermined distance away from the hole 27b toward the control rod 29. The hole 27a will communicate with an accumulator 44 through a port 1f, while it is closed by the peripheral surface of the spool 26 in the condition as shown in FIG.1. An annular groove 27c is formed on the inner surface of the cylinder 27 between the hole 27a and the end face of the cylinder 27 at the side of the control rod 29, and an annular groove 26c is formed on the peripheral outer surface of the spool 26 in opposed relationship with the annular groove 27c. A plug 27f is fluid-tightly fitted into an opening of the cylinder 27 at the side opposite to the boost chamber 20a.

Figure 3:
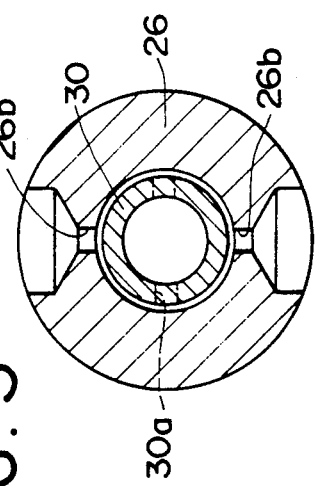
FIG.3 is a sectional view taken along the line A—A in FIG.2.

According to the present embodiment, as shown in FIGS.2 and 3, a stepped tubular member 30 is fixedly fitted into the hole 26a of the spool 26 such that a small-diameter portion of the tubular member 30 faces an opening of each throttle hole 26b to define a predetermined clearance space between the small-diameter portion and each throttle hole 26b. Also, the small-diameter portion of the tubular member 30 has a through hole 30a formed radially in a direction perpendicular to an axis of each throttle hole 26b and spaced therefrom by a predetermined distance toward the plug 27f. The tubular member 30 has a large-diameter portion on which a plurality of slits 30b are formed, and which is fixedly fitted into the hole 26a of the spool 26.

The hydraulic power source 40 comprises a fluid pump 43 driven by an electric motor 42, and is so structured that its input side is connected to the reservoir 41 and its output side is connected to the accumulator 44 through a check valve 45, so that the hydraulic power pressure is supplied to necessary portions through the accumulator 44. The electric motor 42 is intermittently controlled by a control circuit (not shown) in response to a signal of a pressure sensor 40a, and thus the hydraulic power pressure is maintained to be at a predetermined value.

Next will be described the operation of the embodiment as described above. When the brake pedal 2 is not depressed as shown in FIG.1, the first pressure chamber 12 of the master piston 10 communicates with the first fluid chamber 13 through the hole 11d, the first pressure chamber 12 communicates with the wheel cylinders 51a, 52a and the first fluid chamber 13 communicates with the reservoir 41, so that the brake fluid filled in these chambers is under a pressure equal to the pressure in the reservoir 41, that is, substantially under the atmospheric pressure. The brake fluid in the second pressure chamber 16 and the second fluid chamber 17 also communicates with the reservoir 41 and is substantially under the atmospheric pressure, so that the wheel cylinders 53a, 54a communicating with these chambers through the port 16a and the hydraulic circuit 72 are also under the atmospheric pressure. When the hydraulic power source 40 is operated, the hydraulic power pressure is applied to the port 27a of the hydraulic booster 20. In this condition, however, the port 27a is closed, so that the hydraulic booster 20 does not operate.

When the brake pedal 2 is depressed, the reaction piston 22 is pushed with the input rod 3. And, when the reaction piston 22 is moved until it abuts on the power piston 5, the control lever 25 is rotated counterclockwise relative to the support lever 24, and the head of the control lever 25 pushes the spool 26. Thereby, the spool 26 is moved toward the plug 27f as shown in FIG.2 to be positioned in its power position, in which the spool 26 blocks the communication between the hole 27b and the boost chamber 20a, and affords the communication between the hole 27a and the throttle holes 26b through the annular groove 26c and the annular groove 27c. Thus, the hydraulic power pressure from the hydraulic power source 40 is introduced from the throttle holes 26b into the boost chamber 20a through the clearance space between the tubular member 30 and the hole 26a, the through hole 30a and an axial hole 30c of the tubular member 30 to push the power piston 5, so that the boosting force is applied to the master piston 11, and the reaction force is transmitted to the brake pedal 2 through the reaction piston 22. The hydraulic pressure within the boost chamber 20a is regulated to maintain a predetermined pressure with the spool valve 28 operated by the control lever 25 in response to the relative displacement of the power piston 5 to the reaction piston 22.

The first piston 11 is moved with the power piston 5 operated in response to depression of the brake pedal 2. When the first piston 11 is moved by a predetermined distance, the valve member 14a closes the hole 11d, and the hydraulic braking pressure is generated in the first pressure chamber 12. The hydraulic braking pressure generated in the first pressure chamber 12 is applied to the wheel cylinders 51a, 52a through the first hydraulic circuit 71, and simultaneously the second piston 15 is moved toward the bottom of the cylinder bore 10a. When the second piston 15 is moved by a predetermined distance, the valve member 18a closes the hole 15d, and the hydraulic braking pressure is generated in the second pressure chamber 16. The hydraulic braking pressure generated in the second pressure chamber 16 is applied to the wheel cylinders 53a, 54a through the second hydraulic circuit 72.

Figure 4:
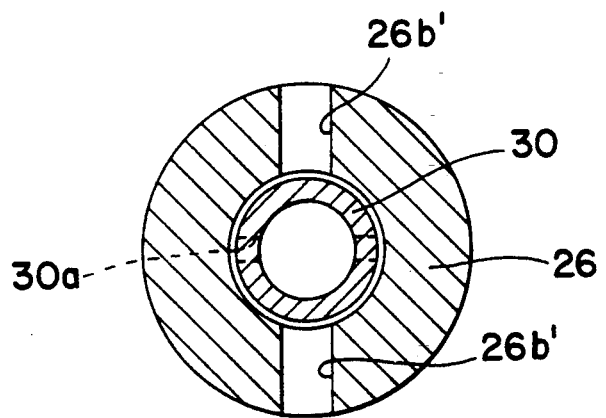
FIG. 4 is a sectional view of another embodiment according to the present invention taken along the line A—A in FIG. 2.

Thus, in the present embodiment, the tubular member 30 is fixedly fitted into the hole 26a of the spool 26 to form the predetermined clearance space between the small-diameter portion of the tubular member 30 and the inner surface of the hole 26a, to which the throttle holes 26b open. According to this embodiment, in the power position of the spool 26 as shown in FIG.2, streams of the hydraulic power pressure jet from the throttle holes 26b facing each other are prevented from colliding with each other by the tubular member 30. Therefore, when the spool 26 is abruptly moved in response to the abrupt depression of the brake pedal 2, the streams of the hydraulic power pressure are prevented from interfering with each other severely, so that the uncomfortable noise caused by the interference of hydraulic power pressures is effectively prevented. Also, according to the present embodiment, as long as the clearance space between the tubular member 30 and the inner surface of the hole 26a of the spool 26 is defined to provide an optimum space therebetween, the hydraulic power pressure may be introduced into the boost chamber 20a adequately. In this case, therefore, the throttle holes 26b of the spool 26 may be replaced by through holes 26' as shown in FIG. 4 which are easy to work, so that the manufacturing cost of the hydraulic booster may be reduced.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic booster for use in a hydraulic braking system of an automotive vehicle having a power source for generating a hydraulic power pressure, a reservoir for storing an amount of brake fluid, and a master cylinder for introducing said brake fluid thereinto from said reservoir and generating a hydraulic braking pressure in response to movement of an input rod, comprising:

a housing connected to said master cylinder for defining therein a boost chamber;

a power piston received in said boost chamber and slidably supported by said housing for transmitting a boost force to said master cylinder in response to the movement of said input rod;

a pressure control valve disposed in said housing for introducing said hydraulic power pressure from said power source and controlling said hydraulic power pressure in response to the movement of said input rod, said pressure control valve including a cylinder fixed to said housing for defining therein a bore, and a spool slidably received in said bore and provided with an axial hole defined therein and at least two radial holes facing each other and communicating with said axial hole, said spool being positioned to communicate said axial hole with said reservoir in a stop position of said spool, and to communicate said axial hole with said power source through said radial holes while blocking the communication between said axial hole and said reservoir in a power position of said spool; and a tubular member fixedly positioned in said axial hole of said spool, said tubular member having a large diameter portion and a small diameter portion to form a stepped outer surface, said large diameter portion being fixedly fitted into said axial hole of said spool and said small diameter portion forming a predetermined clearance between an outer surface of the spool and an inner surface of said axial hole.

2. A hydraulic booster as set forth in claim 1, wherein said small diameter portion of said tubular member has at least one hole extending therethrough at a position spaced axially away from said radial holes of said spool by a predetermined distance.

3. A hydraulic booster as set forth in claim 2, wherein said at least one hole of said tubular member is positioned between said radial holes of said spool and said large diameter portion of said tubular member.

4. A hydraulic booster as set forth in claim 3, wherein said hole of said tubular member is formed radially in a direction perpendicular to an axis of said radial holes of said spool.

5. A hydraulic booster as set forth in claim 1, wherein said large diameter portion has a plurality of slits formed axially at an open end of said tubular member.

6. A hydraulic booster as set forth in claim 1, wherein each of said radial holes of said spool is formed as a throttle hole having a reduced diameter portion for throttling the brake fluid supplied therethrough into said axial hole of said spool.

7. A hydraulic booster as set forth in claim 1, wherein each of said radial holes of said spool is formed into a through hole of even diameter from one end thereof to the other end thereof.

* * * * *